(12) United States Patent
Lima

(10) Patent No.: US 12,303,839 B2
(45) Date of Patent: May 20, 2025

(54) PATTERNED NANOFIBER ARRAYS ASSEMBLED THROUGH PATTERNED FILTRATION

(71) Applicant: LINTEC OF AMERICA, INC., Richardson, TX (US)

(72) Inventor: Marcio D. Lima, Richardson, TX (US)

(73) Assignee: LINTEC OF AMERICA, INC., Plano, TX (US)

( * ) Notice: Subject to any disclaimer, the term of this patent is extended or adjusted under 35 U.S.C. 154(b) by 250 days.

(21) Appl. No.: 17/726,819

(22) Filed: Apr. 22, 2022

(65) Prior Publication Data

US 2022/0250009 A1      Aug. 11, 2022

Related U.S. Application Data

(63) Continuation of application No. PCT/US2020/049866, filed on Sep. 9, 2020.

(60) Provisional application No. 62/962,532, filed on Jan. 17, 2020, provisional application No. 62/925,519, filed on Oct. 24, 2019.

(51) Int. Cl.
*B01D 67/00*   (2006.01)
*B01D 69/12*   (2006.01)
*B01D 71/02*   (2006.01)

(52) U.S. Cl.
CPC ....... *B01D 67/0088* (2013.01); *B01D 69/122* (2013.01); *B01D 71/021* (2013.01); *B01D 2325/08* (2013.01)

(58) Field of Classification Search
CPC ............. B01D 67/0088; B01D 69/122; B01D 71/021; B01D 2325/08; B01D 2239/0241; B01D 2239/0428; B01D 2239/0478; B01D 2239/0681; B01D 39/1623; B01D 39/2003; B01D 39/1692; B01D 2239/025;
(Continued)

(56) References Cited

U.S. PATENT DOCUMENTS 7,833,355 B2    11/2010   Capizzo
8,556,089 B2    10/2013   Kalayci et al.
(Continued)

FOREIGN PATENT DOCUMENTS

JP    2000-203821    7/2000
JP    2001-130904    5/2001
(Continued)

OTHER PUBLICATIONS

Machine Translation of JP 2014-044839 A. (Year: 2014).*
(Continued)

*Primary Examiner* — Brian Handville
(74) *Attorney, Agent, or Firm* — Greenblum & Bernstein, P.L.C.

(57) ABSTRACT

An array of discrete nanofiber films that are physically separated from one another are described. Techniques for forming the nanofiber film array are also described. Techniques for forming these structures include placing a suspension of nanofibers and/or nanoparticles on a patterned substrate. A pressure differential is applied, drawing the solvent of the suspension through holes in a mask. The nanofibers collect on an impermeable layer on the mask in a pattern corresponding to the negative features (grooves, holes, trenches) of the mask as the solvent is flowed through the holes.

7 Claims, 5 Drawing Sheets

(58) Field of Classification Search
CPC .... B01D 2239/0258; B01D 2239/0654; B01D 39/18; D01F 9/127
See application file for complete search history.

(56) References Cited

U.S. PATENT DOCUMENTS

| | | | |
|---|---|---|---|
| 9,017,773 | B2 | 4/2015 | D'Arcy et al. |
| 9,605,363 | B2 | 3/2017 | Zhang et al. |
| 10,244,637 | B2 | 3/2019 | Jones et al. |
| 2006/0159916 | A1* | 7/2006 | Dubrow ............... B01J 20/3219 428/401 |
| 2008/0259262 | A1 | 10/2008 | Jones et al. |
| 2010/0285972 | A1 | 11/2010 | Dubrow et al. |
| 2012/0077406 | A1 | 3/2012 | Serivens et al. |
| 2015/0250078 | A1 | 9/2015 | Matsuda et al. |

FOREIGN PATENT DOCUMENTS

| | | |
|---|---|---|
| JP | 2010-525526 | 7/2010 |
| JP | 2014-44839 | 3/2014 |
| TW | I487125 | 6/2015 |
| WO | 2007/015710 | 2/2007 |

OTHER PUBLICATIONS

Japanese Office Action dated Aug. 6, 2024 issued in Japanese Patent Application No. 2022-522744, along with corresponding English translation.
International Search Report issued in International Patent Application No. PCT/US2020/049866, dated Feb. 4, 2021.
Office Action dated Feb. 4, 2025 issued in Taiwanese patent application No. 109136432 along with corresponding English translation.
Office Action dated Jan. 28, 2025 issued in Japanese patent application No. 2022-522744, along with corresponding English translation.

* cited by examiner

Nanofiber forest

Example reactor for growing nanofibers

PATTERNED NANOFIBER ARRAYS ASSEMBLED THROUGH PATTERNED FILTRATION

RELATED APPLICATIONS

This application is a bypass continuation of PCT/US2020/049866, filed Sep. 9, 2020, which claims priority under 35 USC § 119(e) to U.S. Provisional Patent Application No. 62/925,519 entitled "PATTERNED NANOFIBER ARRAYS," filed on Oct. 24, 2019, and U.S. Provisional Patent Application No. 62/962,532 entitled "PATTERNED NANOFIBER ARRAYS ASSEMBLED THROUGH PATTERNED FILTRATION," filed on Jan. 17, 2020, which are each incorporated by reference herein in its entirety.

TECHNICAL FIELD

The present disclosure relates generally to nanofibers. Specifically, the present disclosure relates to techniques for forming patterned nanofiber arrays.

BACKGROUND

Nanofibers are known to have unusual mechanical, optical, and electronic properties. However, devising configurations of nanofibers that can be integrated into commercial products has been challenging because of the nanoscale dimensions of the nanofibers. One example of an advance in developing commercially useful embodiments of nanofibers is the fabrication of a nanofiber "forest." This forest is an array of parallel nanofibers grown perpendicular to a substrate surface. The forest can be drawn from the substrate into a nanofiber sheet, in which the nanofibers are parallel to one another within the plane of the sheet. Nanofiber sheets can then optionally be formed into nanofiber yarns.

SUMMARY

In a first example, a method for forming a plurality of discrete nanofiber films on a substrate includes providing a filter assembly having a mask and a porous layer opposite the mask, the filter assembly including a membrane adjacent the mask, the mask defining a plurality of holes, placing a nanofiber suspension comprising nanofibers suspended in a solvent on the membrane of the filter assembly, applying a pressure differential to the filter assembly, the pressure differential flowing the solvent through holes of the plurality of holes in the mask, and responsive to flowing the solvent through the holes, forming nanofiber structures on the membrane at locations corresponding to the holes of the plurality of holes. The membrane can be permeable to the solvent and not permeable to the nanofibers suspended in the solvent. The plurality of holes may form a regular pattern of geometric shapes and the nanofiber structures can comprise discrete nanofiber films, the nanofiber films each comprising a plurality of nanofibers randomly oriented relative to each other in a plane of the nanofiber film. The nanofiber film can include conductive nanoparticles, and the method can include removing the nanofiber structures from the membrane and placing the nanofiber structures on a second substrate.

In a second example, a method for forming a plurality of discrete conductive structures on a nanofiber substrate includes providing a filter assembly having a mask and a porous layer opposite the mask, the mask defining a plurality of holes, placing a nanofiber substrate over the mask, placing a suspension of conductive nanoparticles in a solvent in fluid communication with the nanofiber substrate, applying a pressure differential to the filter assembly, the pressure differential forcing the solvent through holes of the plurality of holes in the mask, and forming conductive structures on the nanofiber substrate in a pattern corresponding to the holes of the plurality of holes. The nanofiber substrate can be a filtered nanofiber film comprising a plurality of nanofibers randomly oriented relative to each other in a plane of the filtered nanofiber film. The nanofiber substrate can be a drawn nanofiber sheet comprising a plurality of nanofibers aligned end to end in a plane of the drawn nanofiber sheet. The conductive nanoparticles can comprise silver (Ag) nanowires. The plurality of holes can form a regular pattern of geometric shapes, and the conductive structures may be in the regular pattern of geometric shapes corresponding to the plurality of holes. The method can include removing the nanofiber substrate by immersing the filter assembly and the nanofiber substrate thereon into water and may further include placing the nanofiber substrate and the conductive structures thereon onto a final substrate.

In another example a nanofiber structure comprises a plurality of nanofiber films on a substrate, the nanofiber films comprising a plurality of nanofibers randomly oriented relative to each other in a plane of the films. The nanofiber films can be homogeneous or heterogeneous, can be discrete and separated from one another and/or may form a regular array of films. At least one of the nanofiber films of the plurality can be a geometric shape.

In another example, a composite structure includes a nanofiber substrate, and a plurality of conductive structures in an array on the nanofiber substrate. The nanofiber substrate can be a drawn nanofiber sheet comprising a plurality of nanofibers aligned end to end in a plane of the drawn nanofiber sheet. It can be a filtered nanofiber film comprising a plurality of nanofibers randomly oriented relative to each other in a plane of the filtered nanofiber film. The array can be a regular pattern of geometric shapes.

In another example, a method includes assembling a filter stack comprising a porous layer and a mask on the porous layer, the mask including a pattern of holes and/or negative features below a surface level of the mask, securing the porous layer, applying a pressure differential to the filter stack, the pressure differential resulting in higher pressure above the stack than below it, placing a suspension of a solvent and one or more of nanofibers and conductive nanoparticles on the filter stack, responsive to the applied pressure differential, causing the solvent to flow through holes in the mask, and filtering out an array of one or more of nanofibers and conductive nanoparticles, the array forming a layer or layers that correspond to the pattern of holes and/or negative features in the mask. The method can include placing a nanofiber sheet or a nanofiber film over the mask, and placing the suspension in contact with the nanofiber sheet or the nanofiber film, wherein the one or more of nanofibers and conductive nanoparticles form into the pattern of holes and/or negative features on the nanofiber sheet. The pressure differential can be applied by reducing the pressure below the filter stack in relation to the pressure above the filter stack or by increasing the pressure above the filter stack in relation to the pressure below the filter stack.

Another example is a method comprising flowing a fluid component of a suspension of nanofibers through a membrane, a mask and a porous layer to separate the fluid component from nanofibers, forming nanofiber films by distributing the nanofibers on the membrane in a pattern corresponding to a pattern of holes in the mask, and separating the nanofiber films from the membrane.

Another example is a method of forming conductive structures on a nanofiber membrane, the method comprising flowing a fluid component of a suspension of conductive nanoparticles through a nanofiber membrane, a mask and a porous layer, and separating conductive nanoparticles from the fluid component to form a pattern of conductive structures on the nanofiber membrane. The fluid component can be flowed through the structure in the order of membrane, mask and then then porous layer.

Figure 1:
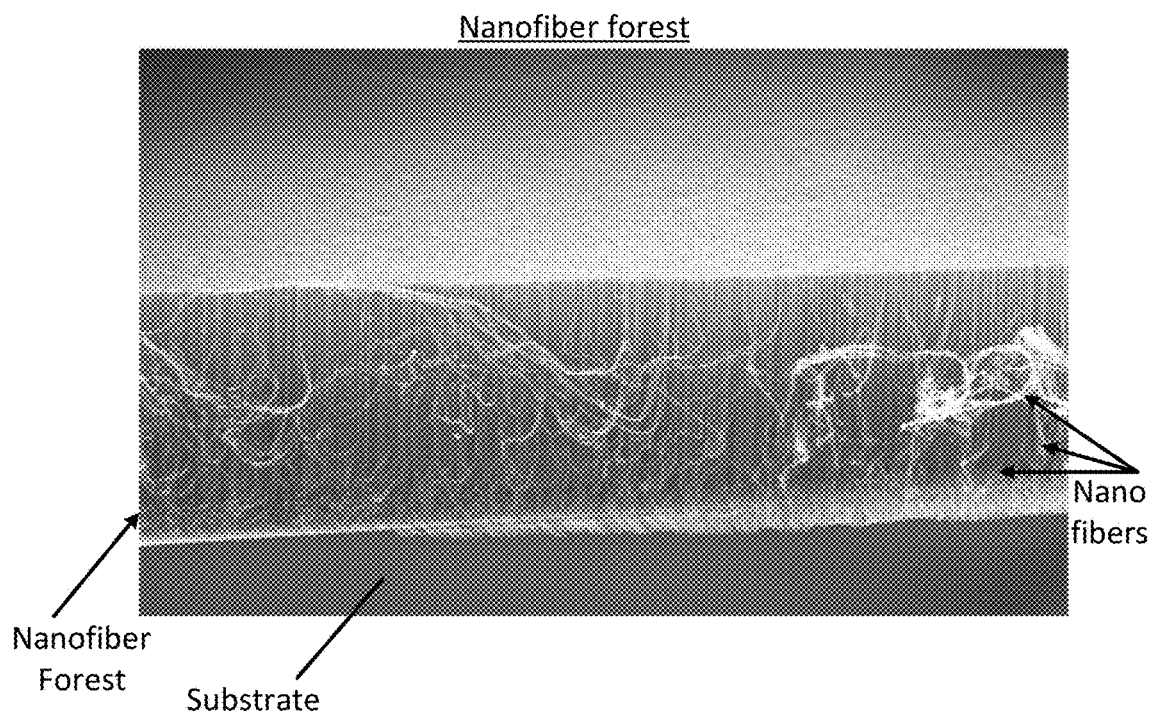
FIG. 1 is a photomicrograph of an example forest of nanofibers on a substrate, in an embodiment.

The figures depict various embodiments of the present disclosure for purposes of illustration only. Numerous variations, configurations, and other embodiments will be apparent from the following detailed discussion. Furthermore, as will be appreciated, the figures are not necessarily drawn to scale or intended to limit the described embodiments to the specific configurations shown. For instance, while some figures generally indicate straight lines, right angles, and smooth surfaces, an actual implementation of the disclosed techniques may have less than perfect straight lines and right angles, and some features may have surface topography or otherwise be non-smooth, given real-world limitations of fabrication processes. In short, the figures are provided merely to show example structures.

DETAILED DESCRIPTION

Overview

Nanofibers often have unusual and interesting properties that are not present in similarly composed bulk materials. However, because of the nanoscopic dimensions of individual nanofibers, some nanofiber-based materials can be challenging to work with. For example, carbon nanofiber sheets, while possessing may interesting properties, are physically delicate and can be torn, folded, or otherwise damaged during processing by even the most subtle forces. Air flows in a laboratory caused by air handling equipment or the breath of an operator can sometimes damage a nanofiber sheet. Because of this physically delicate nature, some development efforts are focused not only on exploring and applying the unusual properties of nanofiber materials, but also on improving the processing of these materials.

Techniques described herein include liquid-phase methods for the formation of a plurality of discrete nanofiber structures separated from one another (equivalently referred to as an "array") on a substrate. Examples of nanofiber structures include filtered films in which individual nanofibers are randomly oriented relative to one another within a plane of the film. Techniques described herein can also include liquid-phase methods for the formation of an array of other structures (e.g., silver nanowire dots or strips) on nanofiber films.

Prior to descriptions of these arrays and the methods for producing the arrays, descriptions of nanofibers, nanofiber filtered films, and nanofiber forests and sheets follows.

Nanofiber Forests

As used herein, the term "nanofiber" means a fiber having a diameter less than 1 μm. While the embodiments herein are primarily described as fabricated from carbon nanotubes, it will be appreciated that other carbon allotropes, whether graphene, micron or nano-scale graphite fibers and/or plates, and even other compositions of nano-scale fibers such as boron nitride may be processed using the techniques described below. As used herein, the terms "nanofiber" and "nanotube" are used interchangeably and encompass both single wall nanotubes, few wall nanotubes and/or multiwall nanotubes in which atoms are linked together to form a cylindrical structure. In some embodiments, multiwall nanotubes as referenced herein have between 6 and 20 walls. As used herein, a "nanofiber sheet" or simply "sheet" refers to a sheet of nanofibers aligned via a drawing process (as described in PCT Publication No. WO 2007/015710, and incorporated by reference herein in its entirety) so that a longitudinal axis of a nanofiber of the sheet is parallel to a major surface of the sheet, rather than perpendicular to the major surface of the sheet (i.e., in the as-deposited form of the sheet, often referred to as a "forest"). This is illustrated and shown in FIGS. 3 and 4, respectively.

The dimensions of nanotubes can vary greatly depending on production methods used. For example, the diameter of a carbon nanotube may be from 0.4 nm to 100 nm and its length may range from 10 μm to greater than 55.5 cm. Carbon nanotubes are also capable of having very high aspect ratios (ratio of length to diameter) with some as high as 132,000,000:1 or more. Given the wide range of dimensional possibilities, the properties of carbon nanotubes are highly adjustable, or "tunable." While many intriguing properties of carbon nanotubes have been identified, harnessing the properties of carbon nanotubes in practical applications requires scalable and controllable production methods that allow the features of the carbon nanotubes to be maintained or enhanced.

Due to their unique structure, nanotubes possess particular mechanical, electrical, chemical, thermal and optical properties that make them well-suited for certain applications. In particular, carbon nanotubes exhibit superior electrical conductivity, high mechanical strength, good thermal stability and are also hydrophobic. In addition to these properties, carbon nanotubes may also exhibit useful optical properties. For example, carbon nanotubes may be used in light-emitting diodes (LEDs) and photo-detectors to emit or detect light at narrowly selected wavelengths. Carbon nanotubes may also prove useful for photon transport and/or phonon transport.

In accordance with various embodiments of the subject disclosure, nanofibers (including but not limited to carbon nanotubes) can be arranged in various configurations, including in a configuration referred to herein as a "forest." As used herein, a "forest" of nanofibers or carbon nanotubes refers to an array of nanofibers having approximately equivalent dimensions that are arranged substantially parallel to one another on a substrate. FIG. 1 shows an example forest of nanofibers on a substrate. The substrate may be any shape but in some embodiments the substrate has a planar surface on which the forest is assembled. As can be seen in FIG. 1, the nanofibers in the forest may be approximately equal in height and/or diameter.

Nanofiber forests as disclosed herein may be relatively dense. Specifically, the disclosed nanofiber forests may have a density of at least 1 billion nanofibers/$cm^2$. In some specific embodiments, a nanofiber forest as described herein may have a density of between 10 billion/$cm^2$ and 30 billion/$cm^2$. In other examples, the nanofiber forest as described herein may have a density in the range of 90 billion nanofibers/$cm^2$. The forest may include areas of high density or low density and specific areas may be void of nanofibers. The nanofibers within a forest may also exhibit inter-fiber connectivity. For example, neighboring nanofibers within a nanofiber forest may be attracted to one another by van der Waals forces. Regardless, a density of nanofibers within a forest can be increased by applying techniques described herein.

Methods of fabricating a nanofiber forest are described in, for example, PCT No. WO2007/015710, which is incorporated herein by reference in its entirety.

Figure 2:
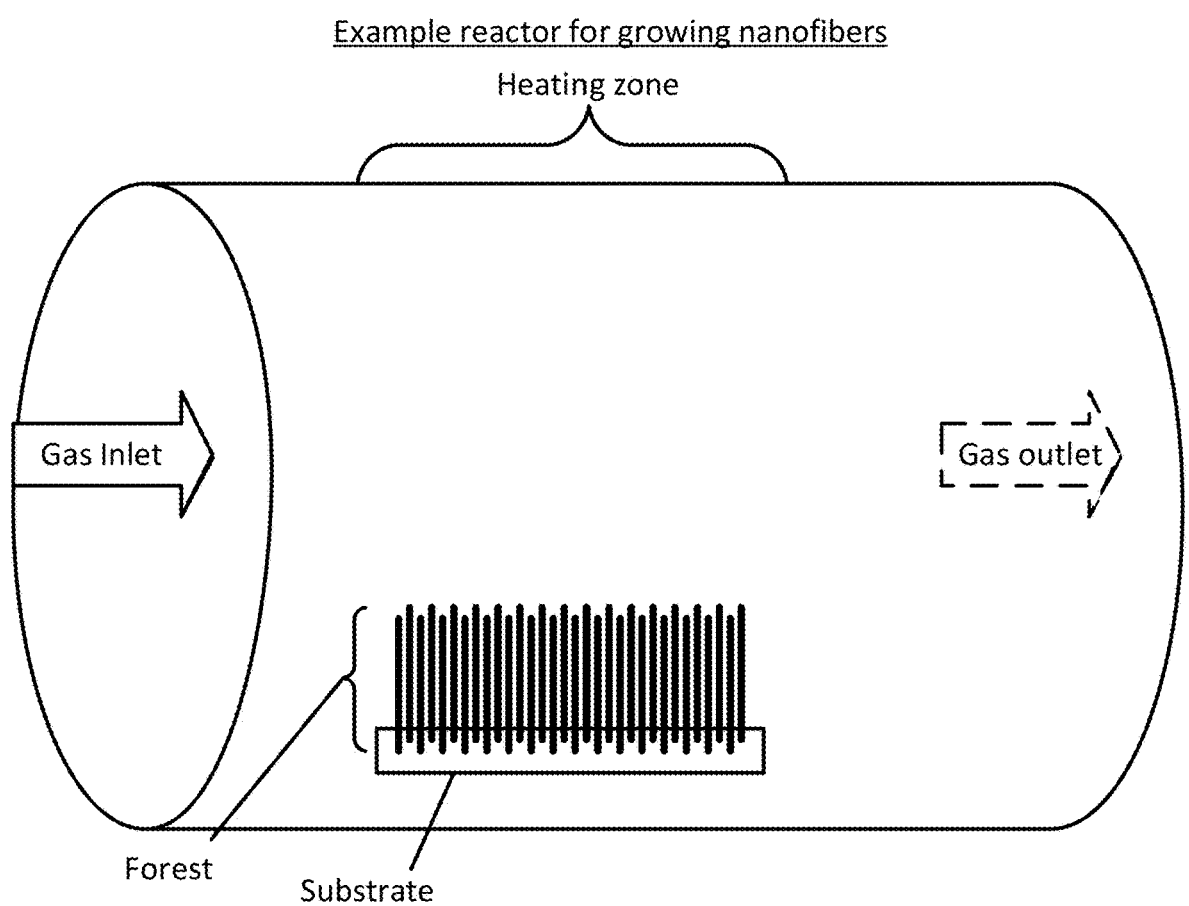
FIG. 2 is a schematic illustration of an example reactor for nanofiber growth, in an embodiment.

Various methods can be used to produce nanofiber precursor forests. For example, in some embodiments, nanofibers may be grown in a high-temperature furnace, schematically illustrated in FIG. 2. In some embodiments, catalyst may be deposited on a substrate, placed in a reactor and then may be exposed to a fuel compound that is supplied to the reactor. Substrates can withstand temperatures of greater than 800° C. or even 1000° C. and may be inert materials. The substrate may comprise stainless steel or aluminum disposed on an underlying silicon (Si) wafer, although other ceramic substrates may be used in place of the Si wafer (e.g., alumina, zirconia, $SiO_2$, glass ceramics). In examples where the nanofibers of the precursor forest are carbon nanotubes, carbon-based compounds, such as acetylene may be used as fuel compounds. After being introduced to the reactor, the fuel compound(s) may then begin to accumulate on the catalyst and may assemble by growing upward from the substrate to form a forest of nanofibers. The reactor also may include a gas inlet where fuel compound(s) and carrier gasses may be supplied to the reactor and a gas outlet where expended fuel compounds and carrier gases may be released from the reactor. Examples of carrier gases include hydrogen, argon, and helium. These gases, in particular hydrogen, may also be introduced to the reactor to facilitate growth of the nanofiber forest. Additionally, dopants to be incorporated in the nanofibers may be added to the gas stream.

In a process used to fabricate a multilayered nanofiber forest, one nanofiber forest is formed on a substrate followed by the growth of a second nanofiber forest in contact with the first nanofiber forest. Multi-layered nanofiber forests can be formed by numerous suitable methods, such as by forming a first nanofiber forest on the substrate, depositing catalyst on the first nanofiber forest and then introducing additional fuel compound to the reactor to encourage growth of a second nanofiber forest from the catalyst positioned on the first nanofiber forest. Depending on the growth methodology applied, the type of catalyst, and the location of the catalyst, the second nanofiber layer may either grow on top of the first nanofiber layer or, after refreshing the catalyst, for example with hydrogen gas, grow directly on the substrate thus growing under the first nanofiber layer. Regardless, the second nanofiber forest can be aligned approximately end-to-end with the nanofibers of the first nanofiber forest although there is a readily detectable interface between the first and second forest. Multi-layered nanofiber forests may include any number of forests. For example, a multi-layered precursor forest may include two, three, four, five or more forests.

Nanofiber Sheets

Figure 3:
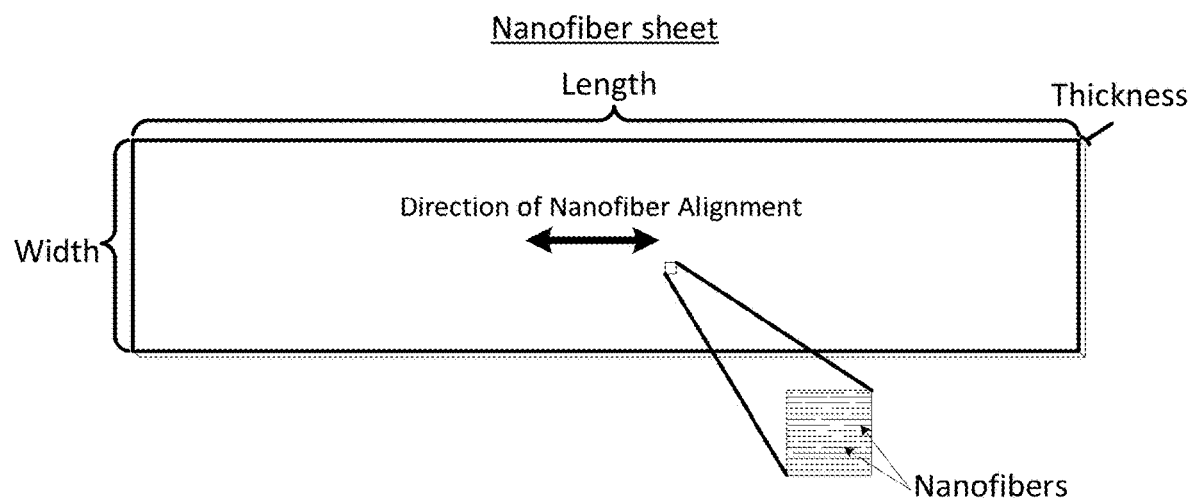
FIG. 3 is an illustration of a nanofiber sheet that identifies relative dimensions of the sheet and schematically illustrates nanofibers within the sheet aligned end-to-end in a plane parallel to a surface of the sheet, in an embodiment.

In addition to arrangement in a forest configuration, the nanofibers of the present application may also be arranged in a sheet configuration. As used herein, the term "nanofiber sheet," "nanotube sheet," or simply "sheet" refers to an arrangement of nanofibers where the nanofibers are aligned end to end in a plane. An illustration of an example nanofiber sheet is shown in FIG. 3 with labels of the dimensions. In some embodiments, the sheet has a length and/or width that is more than 100 times greater than the thickness of the sheet. In some embodiments, the length, width or both, are more than $10^3$, $10^6$ or $10^9$ times greater than the average thickness of the sheet. A nanofiber sheet can have a thickness of, for example, between approximately 5 nm and 30 μm and any length and width that are suitable for the intended application. In some embodiments, a nanofiber sheet may have a length of between 1 cm and 10 meters and a width between 1 cm and 1 meter. These lengths are provided merely for illustration. The length and width of a nanofiber sheet are constrained by the configuration of the manufacturing equipment and not by the physical or chemical properties of any of the nanotubes, forest, or nanofiber sheet. For example, continuous processes can produce sheets of any length. These sheets can be wound onto a roll as they are produced.

As can be seen in FIG. 3, the axis in which the nanofibers are aligned end-to end is referred to as the direction of nanofiber alignment. In some embodiments, the direction of nanofiber alignment may be continuous throughout an entire nanofiber sheet. Nanofibers are not necessarily perfectly parallel to each other and it is understood that the direction of nanofiber alignment is an average or general measure of the direction of alignment of the nanofibers.

Nanofiber sheets may be assembled using any type of suitable process capable of producing the sheet. In some example embodiments, nanofiber sheets may be drawn from a nanofiber forest. An example of a nanofiber sheet being drawn from a nanofiber forest is shown in FIG. 4

Figure 4:
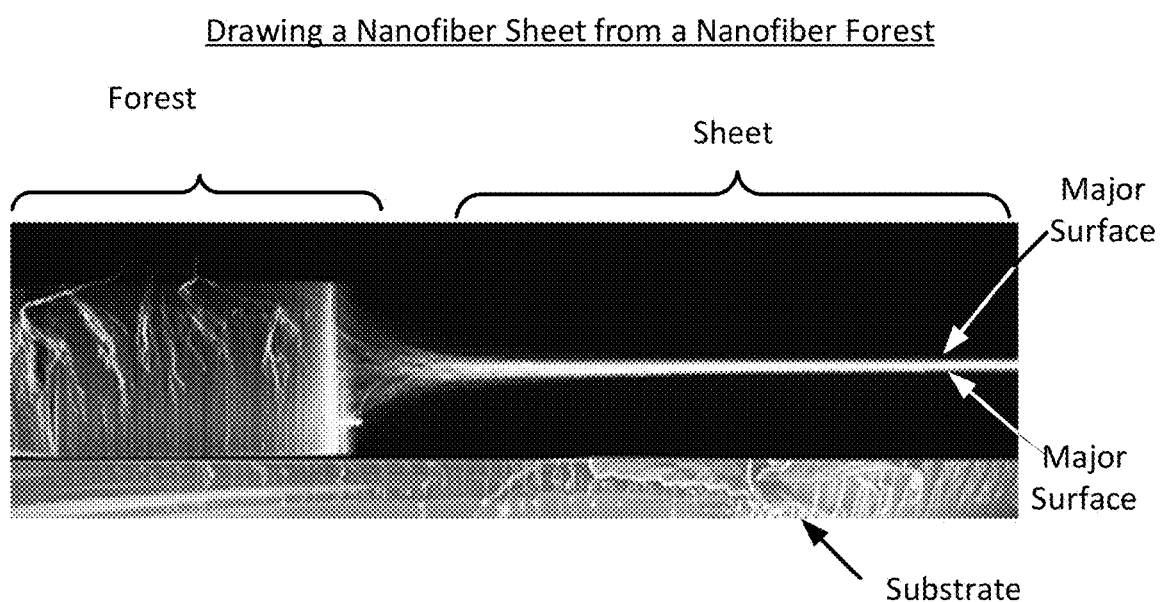
FIG. 4 is an SEM photomicrograph is an image of a nanofiber sheet being laterally drawn from a nanofiber forest, the nanofibers aligning from end-to-end as schematically, in an embodiment.

As can be seen in FIG. 4, the nanofibers may be drawn laterally from the forest and then align end-to-end to form a nanofiber sheet. In embodiments where a nanofiber sheet is drawn from a nanofiber forest, the dimensions of the forest may be controlled to form a nanofiber sheet having particular dimensions. For example, the width of the nanofiber sheet may be approximately equal to the width of the nanofiber forest from which the sheet was drawn. Additionally, the length of the sheet can be controlled, for example, by concluding the draw process when the desired sheet length has been achieved.

Nanofiber sheets have many properties that can be exploited for various applications. For example, nanofiber sheets may have tunable opacity, high mechanical strength and flexibility, thermal and electrical conductivity, and may also exhibit hydrophobicity. Given the high degree of alignment of the nanofibers within a sheet, a nanofiber sheet may be extremely thin. In some examples, a nanofiber sheet is on the order of approximately 10 nm thick (as measured within normal measurement tolerances), rendering it nearly two-dimensional. In other examples, the thickness of a nanofiber sheet can be as high as 200 nm or 300 nm. As such, nanofiber sheets may add minimal additional thickness to a component.

As with nanofiber forests, the nanofibers in a nanofibers sheet may be functionalized by a treatment agent by adding chemical groups or elements to a surface of the nanofibers of the sheet and that provide a different chemical activity than the nanofibers alone. Functionalization of a nanofiber sheet can be performed on previously functionalized nanofibers or can be performed on previously unfunctionalized nanofibers. Functionalization can be performed using any of the techniques described herein including, but not limited to CVD, and various doping techniques.

Nanofiber sheets, as drawn from a nanofiber forest, may also have high purity, wherein more than 90%, more than 95% or more than 99% of the weight percent of the nanofiber sheet is attributable to nanofibers, in some instances. Similarly, the nanofiber sheet may comprise more than 90%, more than 95%, more than 99% or more than 99.9% by weight of carbon.

Filtered Nanofiber Films

Another planar form of assembled nanofibers is a "filtered film" in which one or more of multiwall nanotubes, few wall nanotubes, and/or single wall nanotubes are dispersed in a solvent (i.e., with the majority of nanotubes suspended individually and not adsorbed onto other nanotubes) for subsequent formation into a sheet of randomly oriented carbon nanotubes. This ability of individual nanotubes to be uniformly dispersed in a solvent can in turn produce a dimensionally uniform (i.e., uniform thickness) nanotube film formed by removing the solvent from the suspended nanofibers. This physical uniformity (further improved by stacking multiple filtered films on one another) can also improve the uniformity of the properties across the film (e.g., transparency to radiation).

For the purposes of clarity, multiwall nanotubes are considered to have from 4 to 20 concentric walls and a diameter of from 4 nm to 100 nm, few wall nanotubes are considered to have two or three concentric walls and a diameter of from 2 nm to 6 nm, and single wall carbon nanotubes are considered to have 1 wall and a tube diameter of from 0.2 nm to 4 nm.

Each of these three different types of nanotubes can have different properties. In one example, few wall carbon nanotubes and single wall carbon nanotubes can be more conveniently dispersed in a solvent (i.e., with the majority of nanotubes suspended individually and not adsorbed onto other nanotubes) for subsequent formation into a sheet of randomly oriented carbon nanotubes. This ability of individual nanotubes to be uniformly dispersed in a solvent can in turn produce a dimensionally uniform nanotube filtered film formed by removing the solvent from the suspended nanofibers. The strength of van der Waals attraction between nanofibers also differs between single/few wall nanofibers and multiwall nanofibers. Generally, single/few wall nanofibers have a greater van der Waals attraction to each other than that observed for multiwall nanofibers. This increased attraction between single/few wall nanofibers can improve the ability of few/single wall carbon nanotubes to adhere to one another to form a coherent nanofiber structure, such as a filtered film. The sheets or films formed from single wall carbon nanotubes and few wall carbon nanotubes are able to conform to a topography of an underlying surface at smaller dimensions than sheets or films formed from multiwall carbon nanotubes. In some examples, sheets or films formed from single wall carbon nanotubes and/or few wall carbon nanotubes can conform to a topography of an underlying substrate as small as 10 nm, which is at least 50% smaller than the feature size a multiwall carbon nanotube film can conform to. In some cases, the multiwall carbon nanotubes are more likely than single/few wall nanotubes to agglomerate together and thereby produce a structurally non-uniform film that is less likely to conform and/or adhere to an underlying surface.

Preparation of a filtered film can begin by preparing a dry mixture of the desired proportion of one or more of multi-wall nanotubes, few wall nanotubes, and/or single wall nanotubes. This mixture of one or more of the different types of nanotubes can be then suspended in a solvent. In another example, separate suspensions of known concentrations of nanotubes in a solvent are prepared. For example, separate suspensions of multiwalled carbon nanotubes, few wall carbon nanotubes, and single wall nanotubes can be prepared. The suspensions can then be mixed in a desired proportion to arrive at the desired relative proportions of the multiwall, and few/single wall nanotubes in the combined suspension and ultimately the final filtered film.

In some examples the solvent used to prepare nanotube suspensions can include water, isopropyl alcohol (IPA), N-Methyl-2-pyrrolidone (NMP), dimethyl sulfide (DMS), and combinations thereof. In some examples a surfactant can also be included to aid the uniform dispersion of carbon nanofibers in the solvent. Example surfactants include, but are not limited to, sodium cholate, sodium dodecyl sulfate (SDS), and sodium dodecyl benzene sulphonate (SDBS). Weight percentage of surfactant in the solvent can be any effective concentration, for example between 0.1 weight % to 10 wt. % of solvent. In one set of embodiments, a mixture of multiwalled carbon nanotubes and few/single wall carbon nanotubes can be prepared and suspended in water and SDS surfactant. The ratio of multiwalled to single (or few) walled carbon nanotubes by weight can vary from 100% multiwalled to 100% single walled, including 0% multiwalled, 20% multiwalled, 40% multiwalled, 60% multiwalled or 80% multiwalled, and all ratios therebetween. Mixing and suspension of the nanotubes in the solvent can include mechanical mixing (e.g., using a magnetic stir bar and stirring plate), ultrasonic agitation (e.g., using an immersion ultrasonic probe) or other means.

As described above, examples described herein include nanofiber films that can be formed from one type of nanofiber (e.g., single wall, few wall, multiwall) or a combination of these different types of nanofibers. Examples that are composed of more than one type of nanofiber can be described as "composite films" due to the combination or mixture of different nanofiber types. In some examples herein, a multiwalled carbon nanotube can have a median length of approximately 300 μm (+/−10%). As will be appreciated in light of the following description, multi-walled carbon nanotubes having a length of at least 250 μm or longer can be included in a filtered film to improve the mechanical stability of filtered films that also include single wall and/or few wall carbon nanotubes, which generally are shorter (e.g. from 0.5 μm to 30 μm). Films that are formed exclusively from either the longer multiwalled nanotubes or shorter few/single wall carbon nanotubes are generally not as durable (i.e., resistant to mechanical failure such as cracking or disintegrating) as those that include a mixture of the multiwall and few/single wall nanotubes.

Figure 5:
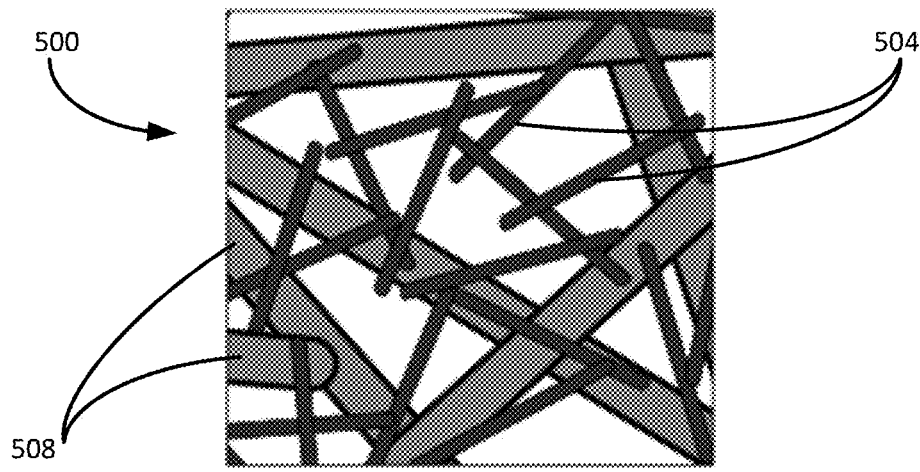
FIG. 5 is a schematic illustration of a portion of a filtered nanotube film that includes larger and longer multiwall carbon nanofibers intermixed with single wall and/or few wall carbon nanotubes, all of which are randomly oriented within a plane of the film, in an embodiment.

FIG. 5 is a schematic illustration of a composite nanotube filtered film 500, in an example of the present disclosure. As shown, the composite nanotube filtered film 500 includes single/few wall nanotubes 504 that are inter-dispersed with multiwall carbon nanotubes 508. In this example film 500, the single/few wall carbon nanotubes 504 can have at least two beneficial effects on the structure of the film 500 as a whole. For example, the single/few wall carbon nanotubes 508 can increase the number of indirect connections between proximate multiwalled carbon nanotubes 508 by bridging the gaps between proximate multiwalled carbon nanotubes 504. The interconnections between the short and long nanofibers can improve the transfer and distribution of forces applied to the film and thus improve durability. In a second example of a beneficial effect, the single/few wall carbon nanotubes 504 can decrease a median and/or mean size of the gaps between adjacent and/or overlapping multiwall carbon nanotubes 508, which can be advantageous for some embodiments. Furthermore, too many longer multi-walled carbon nanotubes can, when dispersed in a solvent, agglomerate. This can result in a non-uniform film. Shorter nanotubes are more easily dispersed in a solvent and thus are more likely to form a dimensionally uniform film having a uniform density of nanotubes per unit volume or area.

Properties of Nanofiber Filtered Films

Filtered films, particularly those made with single and/or few wall carbon nanotubes also generally have greater transparency to some wavelengths of radiation. In some examples, transmittance of incident radiation can be as high as 90% or 97% at 550 nm. In some cases, this transmittance is significantly higher than drawn sheets of multiwall carbon nanotubes (such as those drawn from a carbon nanotube forest, described below). While not wishing to be bound by theory, it is believed that the aligned orientation of nanotubes in a drawn sheet increases scattering of the radiation relative to a filtered film. In part, the greater transparency of filtered films (with their randomly oriented nanotubes) has prompted interest in forming transparent filters and pellicles from filtered carbon nanotube films in a variety of applications.

Despite the advantages of single wall carbon nanotubes and few wall carbon nanotubes described above, multiwall carbon nanotubes also have advantages not necessarily observed to the same degree in nanotube structures formed from single or few wall nanotubes. For examples, structures formed from multiwall carbon nanotubes are generally observed to have greater emissivity than those formed from few/single wall carbon nanotubes. While not wishing to be bound by theory, it is believed that the greater number of walls and greater diameter of multiwall carbon nanotubes are factors in the increased emissivity. For example, multi-wall carbon nanotube structures (e.g., the nanotube forest, a nanotube sheet) have a greater thermal emissivity than nanotube structures formed from few/single wall nanotubes. In one comparative example, an emissivity of a nanofiber structure comprising multiwall carbon nanotubes is on the order of 0.275 (+/−15%) whereas a nanofiber structure comprising single wall carbon nanotubes can have a significantly lower emissivity of 0.05 (+/−15%). High emissivity can be particularly advantageous in technological applications in which processes can cause heating within the nanofiber structure, and mechanisms of conductive or convective cooling of the nanofiber structure are limited or not technically feasible.

Nanofiber structures having transparency to certain wavelengths of radiation (e.g., extreme ultraviolet or "EUV" in the range of 10 nm to 124 nm) have promise for use as a filter (also referred to as a "pellicle") in EUV lithography devices. The pellicle can act as a particle filter that prevents foreign particles from landing on a surface of the material being patterned and/or from landing on a surface of the lithography mask being used to pattern a photoactive surface. This reduces the rate of lithographically introduced defects, thus improving manufacturing yields of the patterned devices.

Despite the high transparency in the EUV radiation wavelength range, challenges remain in adopting nanofiber EUV pellicles. For example, cooling a nanofiber pellicle may be important for preventing overheating of the pellicle due to absorption of EUV energy during lithographic patterning. Elevated temperatures in the pellicle can degrade nanofiber structure integrity, and the opportunities for convective and or conductive cooling of the nanofiber structure in this environment are low given that EUV lithography is performed in a vacuum and the pellicle is mostly suspended (with peripheral edges being attached to a frame). For this reason, thermal emission is the preferred mechanism of cooling of a nanofiber pellicle used for EUV applications.

While multiwall carbon nanotube structures generally have a higher emissivity, which would address the problem of cooling in EUV pellicle, multiwall carbon nanotubes when aligned in a drawn sheet also are less transmissive than randomly oriented single/few wall carbon nanofibers in a filtered film. The more transparent (but less emissive) few wall/single wall nanofiber films are often too mechanically delicate to be used as a pellicle. In some cases, because of their relative short lengths (e.g., less than 100 μm), films and sheets made from few wall/single wall nanofibers are fragile and can disintegrate when subjected to pressure cycles (e.g., changes in pressure of +/−1 atmosphere to 2 atmospheres (from atmospheric pressure to vacuum)) commonly used in EUV lithography machines.

Patterned Nanofiber Arrays

While the preceding configurations of nanofibers have generally a planar, continuous configuration (whether a sheet or forest), embodiments described below can use the solvent-based techniques described above to form a patterned array of discrete nanofiber filtered films (in any of a variety of shapes and patterns) on a substrate. For example, a pattern of discrete circular, square, linear, columnar, or other nanofiber filtered films separated from one another can be formed on a substrate. In some examples, the resulting array is electrically conductive, and/or transparent to extreme UV radiation, infrared radiation, or other wavelengths of radiation in the optical spectrum. This patterned array of nanofiber structures can be transferred to another substrate if desired.

Figure 6:
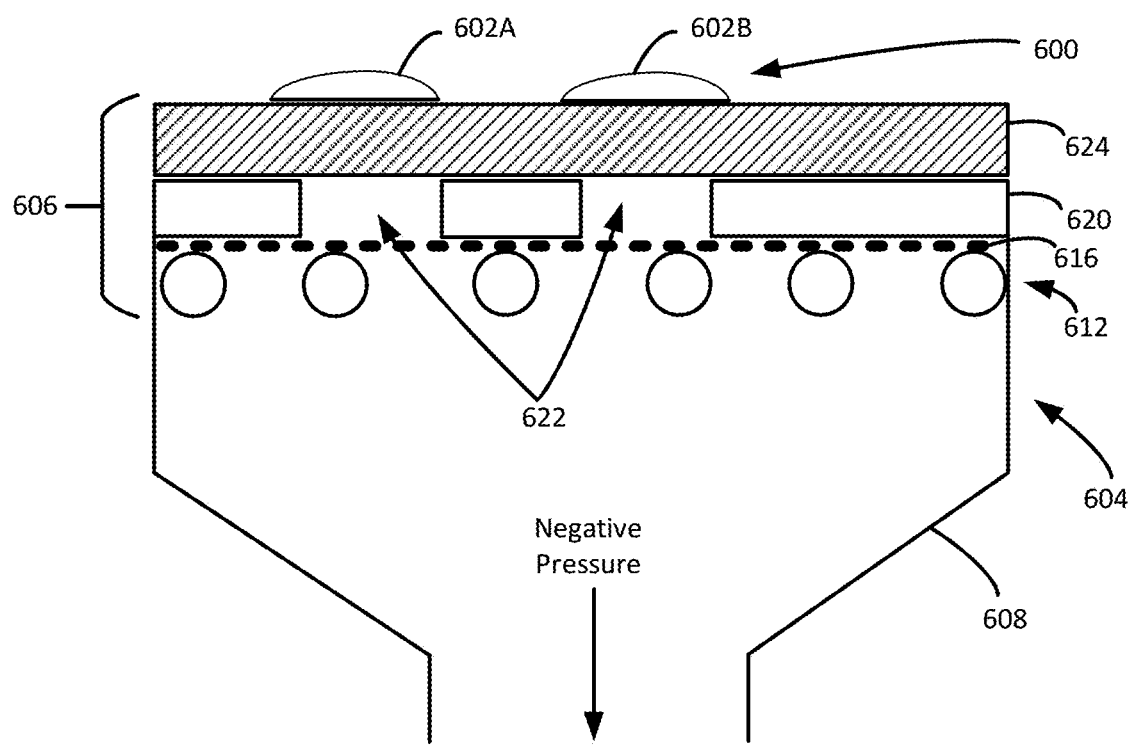
FIG. 6 is a cross-sectional side view of an example patterned nanofiber array and a processing structure on which the patterned array is formed, in an embodiment

FIG. 6 illustrates a cross-sectional view of one embodiment of a patterned nanofiber array 600 and a processing structure 604 on which the patterned array is formed. The patterned nanofiber array 600 in this cross-sectional view includes nanofiber film disks 602A and 602B. The processing structure 604 includes a filter assembly 606 and a suction fitting 608.

At a high level, techniques for forming the patterned nanofiber array 600 begin by the placement of the filter assembly 606 on the suction fitting 608 as shown in FIG. 6. A pressure differential can then be applied across membrane 624 with pressure being greater on the upper side than the down side. For example, negative pressure can then be applied to the filter assembly 606 via a vacuum pump or other similar device, via the suction fitting 608. A suspension of nanofibers (including one or more types of nanofibers as described above) can be applied to an exposed surface of the filter assembly 606. The negative pressure applied to the surface of the filter assembly 606 opposite the applied nanofiber suspension can draw the suspension toward holes in one layer of the filter assembly. Because the solvent is able to pass through the various layers of the filter assembly, but the nanofibers are not, the nanofibers remain on the exposed surface of the filter assembly 606 in a pattern. A more detailed description of the process and the various elements shown in FIG. 6 follows.

The filter assembly 606 includes a support frame 612, a porous layer 616, a mask 620, and a membrane 624.

The porous layer 616 is comprised of one or more porous materials (i.e., materials that allow the passage of fluids) that can be held in contact with one side of the mask 620 and between the mask 620 and a source of negative pressure (e.g., a vacuum pump). The porous and gas/fluid permeable nature of the porous layer 616 helps to provide a more even distribution of negative pressure across an entire area of the mask 620. Examples of porous and/or gas/fluid permeable materials that can be used to form the porous layer 616 include but are not limited to woven fabrics (e.g., nylon woven fabric, acrylic woven fabrics, synthetic fiber woven fabrics, natural fiber woven fabrics,) non-woven fabrics (felts, wool, cotton), extruded fabrics and permeable barrier layers (e.g., PTFE such as GORETEX®), sintered glass, sintered stainless steel, and glass frit, among others.

The support frame 612 is used to hold the porous layer 616 in contact with the mask 620 and prevent the porous layer 616 from being separated from the filter assembly 606 during application of negative pressure. If the porous layer is of sufficient rigidity it can serve the purpose of both the porous layer and the support frame.

The mask 620 can be disposed between the porous layer 616 and the membrane 624 and on a side of the porous layer 616 opposite that from the source of negative pressure. The mask 620 includes a pattern of negative spaces 622 (e.g., holes) that corresponds to the pattern into which the array 600 of nanofiber films is to be formed. It is through this pattern of holes 622, intermediated by the porous layer 616, that negative pressure is applied to the suspension of nanofibers on the exposed surface of the filter assembly 606. The mask 620 can be made of a polymer film in which the pattern of holes 622 has been formed. The mask 620 can also be formed from glass or a fabric, either of which can be processed to include holes 622. Other materials that can be used for the mask 620 will be appreciated in light of the present disclosure.

The membrane 624 is a filtration structure that permits the solvent (used to suspend the nanofibers) to be drawn through to the holes 622 in the mask 620 in response to the negative pressure applied via the suction fitting 608. The nanofibers, unable to permeate the membrane 624, collect on the surface of the membrane 624 at locations corresponding to the underlying holes 622 and thus form in an array of discrete nanofiber filtered films corresponding to the pattern of holes 622 in the mask 620. Examples of materials that can be used for the membrane 624 include, but are not limited to, nitrocellulose, cellulose (i.e., filter paper), polytetrafluoroethylene (PTFE), nylon, or any other material generally used as a filtration membrane or filter paper.

The suction fitting 608 can be any structure (e.g., a funnel) that can form a seal with a perimeter of the filter assembly 606 or a portion of the filter assembly 606. This seal enables negative pressure applied through the suction fitting 608 to an underside of the filter assembly 606 to draw solvent through the filter assembly 606. As described above, this causes an array of filtered nanofiber films 600 to form on the exposed surface of the filter assembly 606. In some examples, the applied negative pressure is −1 atmosphere (atm) or between −0.1 atm at −1.0 atm.

The suspension of nanofibers may be agitated during the process to assure even distribution of nanofibers of different sizes or properties. In other cases, the suspension may be allowed to settle in order to partially separate nanofibers of different sizes or properties. For instance, denser or larger multiwalled nanofibers may congregate closer to the bottom of the suspension while single wall or less dense nanofibers remain in a uniform suspension. Taking advantage of this separation, in a single process a layer of primarily multi-walled nanotubes can be deposited first, followed by a layer of primarily few or single walled nanotubes, resulting in a heterogeneous layer.

Figure 7A:
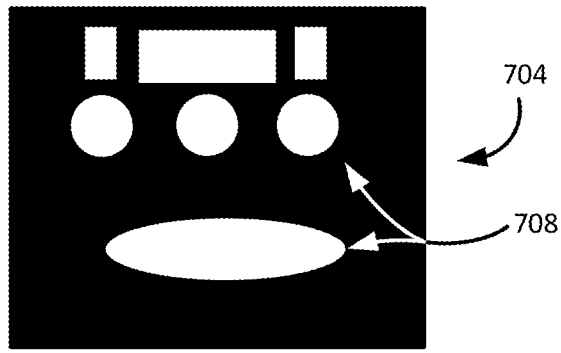
FIGS. 7A, 7C, 7D, and 7F illustrate plan views of various masks, each of while includes a different pattern of holes that can be used to form corresponding nanofiber arrays, in embodiments.
Figure 7B:
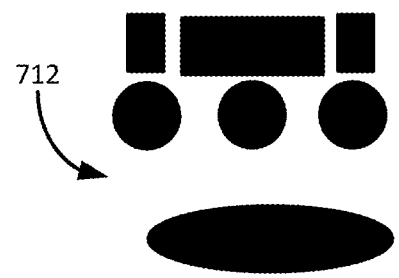
FIGS. 7B, 7E, and 7G illustrate plan views of nanofiber arrays formed by using corresponding masks illustrated in FIGS. 7A, 7C, 7D, and 7F, in embodiments.
Figure 7C:
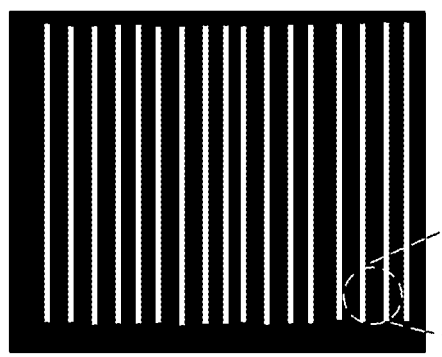
Figure 7D:
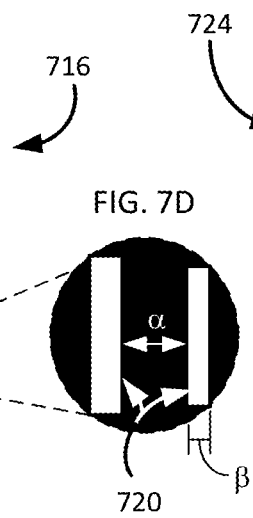
Figure 7E:
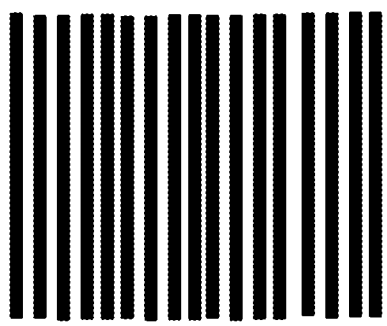
Figure 7F:
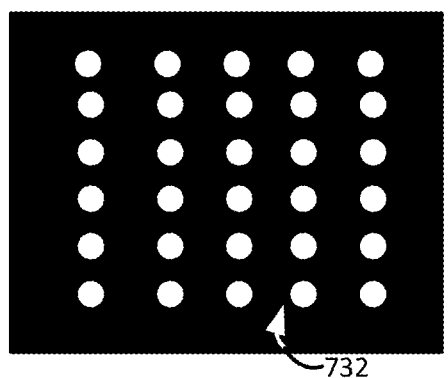
Figure 7G:
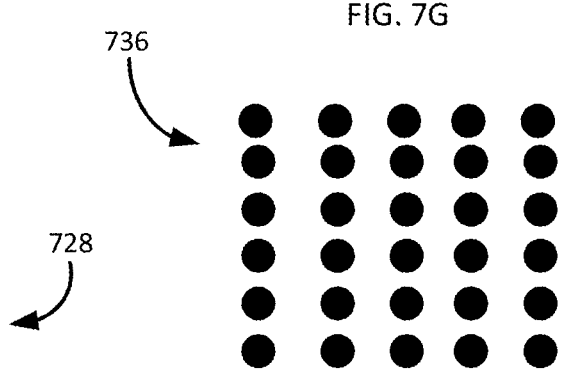

FIGS. 7A-7G illustrate various plan views of example masks and corresponding nanofiber arrays that can be produced using techniques described herein. FIG. 7A illustrates a mask 704 with a variety of circular, elliptical, and rectangular holes 708 therein. This illustrates that in some examples, the mask 704 can include any of a variety of hole shapes including regular polygons, irregular polygons, and any of a variety of other shapes. FIG. 7B illustrates a corresponding pattern of filtered nanofiber films 712. FIG. 7C illustrates a mask 716 that has a plurality of parallel, elongate rectangular holes, each having a width $\beta$ and a separation distance between adjacent sides of $\alpha$ (as shown in magnified inset FIG. 7D). The values of $\alpha$ and $\beta$ can be anywhere between a few microns to hundreds of centimeters. In some examples, the values of $\alpha$ and $\beta$ can be such that the corresponding pattern 724 of filtered nanofiber films (having the same (+/−5%) spacing and width as in the mask 716) can be used as a diffraction grating for extreme UV radiation, infrared radiation, or radiation in the optical spectrum. FIGS. 7F and 7G illustrate a mask 728 with a pattern of circular holes 732 in an array that forms corresponding nanofiber film array 736.

In any of the preceding examples, each structure of the array can have an average thickness of from 0.02 microns to 100 microns (depending on the concentration of nanofibers in the solvent and the amount of suspension that is flowed through the mask 620).

Once formed, the array of nanofiber films (e.g., as illustrated by examples, 712, 724, 736), can be placed onto another (final) substrate. Examples of a final substrate include, but are not limited to, a nanofiber sheet, a graphene sheet, a polymer sheet, a polymer sheet coated with an adhesive layer, a silicon wafer, a glass substrate (e.g., silicate glass), among others. In some examples, the array of nanofiber films can be removed from the membrane 624 by immersion of the membrane 624 into water. Because the nanofiber films are hydrophobic, they will generally be lifted from the membrane 624 upon immersion. The final substrate can then be contacted to the floating array so to adhere to the array and remove the array from the water. In other examples, the array of nanofiber films can be placed directly onto a final substrate by simply placing the final substrate in direct contact with the expose surface of the nanofiber sheets of the array. Depending on the relative attraction/adhesion between the final substrate and the sheets of the array, the sheets of the array may stick to the final substrate and be removed from the membrane 624. In yet other embodiments, a soluble membrane may be used and can be removed (dissolved) from the nanofiber films by applying an appropriate solvent.

Conductive Array on a Nanofiber Filtered Film

Figure 8:
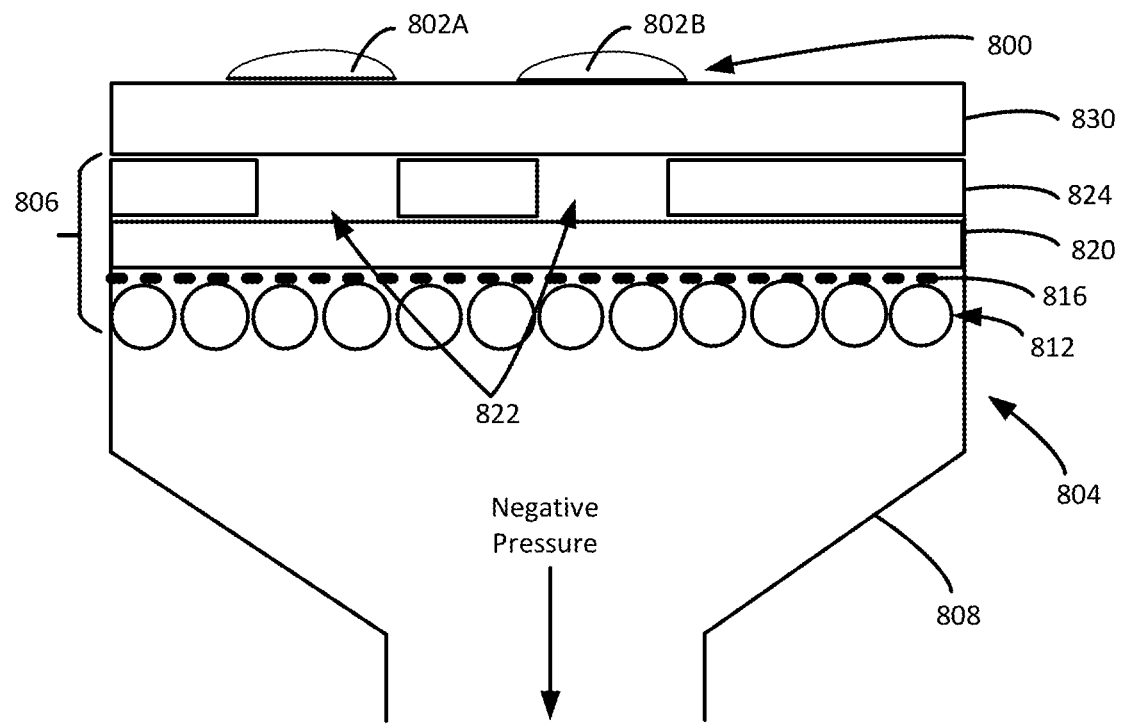
FIG. 8 is a cross-sectional side view of an example patterned array of one or more of nanofibers and/or conductive nanoparticles formed on a nanofiber film that is in turn on a surface of a filter assembly, in an embodiment.

FIG. 8 illustrates an alternative configuration for preparing embodiments in which an array of discrete nanofiber/nanoparticle/microparticle regions can be formed in a pattern and/or array on top of a filtered nanofiber film (or alternatively a nanofiber sheet drawn from a nanofiber forest). The processing structure 804 depicted in FIG. 8 includes a filter assembly 806 and a suction fixture 808. The filter assembly 806 includes a support frame 812, a porous layer 816, a filtration membrane 820, and a patterned non-permeable layer 824.

A nanofiber sheet and/or a nanofiber filtered film 830 is disposed on the patterned nonpermeable layer 824. The nanofiber sheet and/or filtered film 830 corresponds to embodiments described above and thus requires no further description.

The support frame 812, the porous layer 816 and the suction fixture 808 are all the same or similar to those described above in the context of FIG. 6. These elements thus require no further description.

The filtration membrane 820 can be formed from a material, such as a fabric, that helps to smooth out any patterns that may be produced by the rigid support frame 812. It can be similar to porous layer 616 described above.

The patterned nonpermeable layer 824 is fabricated to include holes 822 (of any shape and in any pattern) so that negative pressure applied through the suction fixture 808 can draw solvent from a nanofiber or nanoparticle suspension through various elements of the filter stack 806 thereby leaving a corresponding pattern of nanofibers/nanoparticles/microparticles 802A, 802B on an exposed surface of the nanofiber film/nanofiber sheet 830. The pattern of holes 822 can be formed in the patterned nonpermeable layer 824 by etching (e.g., photolithographically, laser), or mechanical processing (e.g., blades, milling).

In some examples, patterned nonpermeable layer 824 can be formed from sheets of graphene oxide, polymers, glass (e.g., borosilicate glass), silicon wafer, among others.

Unlike the example presented above in the context of FIG. 6, a filtered nanofiber film 830 (or nanofiber sheet drawn from a nanofiber forest) is placed on the filter stack 806. A suspension of nanofiber or of conductive nanoparticles (or both) can then be placed on top of the nanofiber film 830. When a pressure differential is applied to the filter stack, the solvent is drawn through the filter stack via holes 822. The result is an array 800 of nanofiber/nanoparticle/microparticle films 802A, 802B on the exposed surface of the nanofiber film 830 in a pattern that corresponds to the pattern of holes and other negative features in the patterned nonpermeable layer 824. These patterns can be in any shape or distribution, such as those previously described in the context of FIGS. 7A-7G. In some examples, the suspension can be of conductive nanoparticles, such as silver (Ag) nanowires. Regardless of the composition, the array 800 can be referred to generically as an array 800 of conductive structures 802.

The limitations on the strength of the negative pressure are similar to those described in the context of FIG. 6.

In this example, and in FIG. 6, positive pressure can be applied to a surface on which the suspension has been applied (opposite that of the suction filter) so as to push the solvent through the filter stack.

Figure 9:
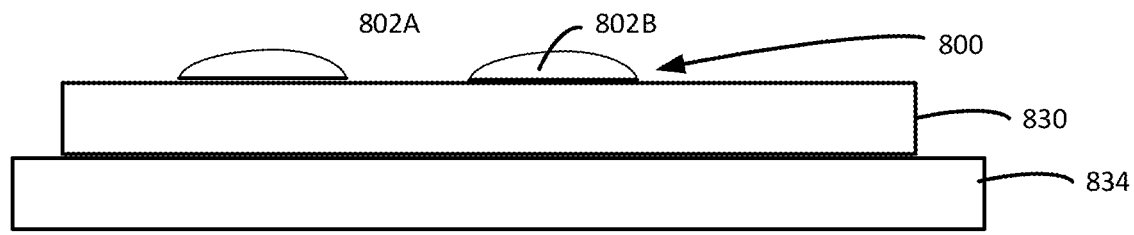
FIG. 9 illustrates a nanofiber substrate on which is disposed an array of conductive structures, in an embodiment.

In some examples, the nanofiber film 830 with the pattern of nanofibers and/or nanoparticles 802A, 802B on the surface can be removed from the filter stack 806 by immersion in deionized water. Because the nanofiber film 830 is hydrophobic, this layer will naturally lift from the filter stack 806 to float on a surface of the water. A frame can then be used to lift the film from the surface of the water, thus depositing the filtered film on the frame. If needed, the surface tension of the water (or other solvent) can be modified by adding surfactants or other solvents. This configuration of an array of conductive structures 802A, 802B on the nanofiber film 830 on a frame (or other substrate) 834 is shown in FIG. 9. The composite film can then be dried (e.g., using a low humidity environment, heat, vacuum). This process can be repeated to form a stack films of, optionally, differently composed mixtures of multiwall, few wall, and/or single wall nanotubes as well as non-carbon materials such as metal particles.

This example process can be repeated multiple times to produce multiple films of carbon nanotubes and/or multiple patterns of nanofiber arrays. In some examples, individual films (having the same or different proportions of multiwall and few/single walled carbon nanotubes in each film) are stacked on one another to form a multilayer composite film. Stacking two or more films can produce a more uniform stack with more uniform properties. For example, if one film in the stack has a local defect (e.g., a hole or tear), adjacent films in the stack can provide physical continuity and uniformity of the properties that would otherwise be absent at the location of the defect. In some embodiments, a stack can include anywhere from 2 to 10 individual films, each of which can have a same or different composition (that is, a different relative proportion of multiwall to single/few wall carbon nanotubes) from other films in the stack.

Further Considerations

The foregoing description of the embodiments of the disclosure has been presented for the purpose of illustration; it is not intended to be exhaustive or to limit the claims to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the invention, which is set forth in the following claims.

What is claimed is:

1. A nanofiber assembly comprising:
   a nanofiber film has a first planar surface and a second planar surface at an opposing side of the first planar surface, the first planar surface being free from a supporting substrate, and
   at least one first nanofiber film disk on the second planar surface of the nanofiber film,
      wherein the at least one first nanofiber film disk comprises a plurality of nanofibers arranged in a planar orientation and randomly oriented relative to each other, has at least one geometry shape, and forms a pattern on the nanofiber film, and
      wherein the nanofiber film comprises a drawn nanofiber sheet, a filtered nanofiber film, or a combination thereof.

2. The nanofiber assembly of claim 1, further comprising a second nanofiber film disk, wherein the at least one first nanofiber film disk and the second nanofiber film disk are discrete and separated from one another.

3. The nanofiber assembly of claim 2, wherein the at least one first nanofiber film disk and the second nanofiber film disk form at least one array.

4. The nanofiber assembly of claim 1, wherein nanofibers included in the at least one first nanofiber film disk are different from nanofibers included in the nanofiber film.

5. The nanofiber assembly of claim 1, wherein the at least one first nanofiber film disk has at least one enclosed void geometry shape.

6. The nanofiber assembly of claim 1, wherein the nanofiber assembly is extreme ultraviolet (EUV) radiation-transparent.

7. The nanofiber assembly of claim 6, wherein the EUV radiation has a wavelength between 10 nm to 124 nm.

* * * * *